United States Patent
Rice

(10) Patent No.: US 7,822,077 B2
(45) Date of Patent: Oct. 26, 2010

(54) THULIUM DOPED FIBER CONFIGURATION FOR ENHANCED HIGH POWER OPERATION

(75) Inventor: Robert Rex Rice, Simi Valley, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 195 days.

(21) Appl. No.: 11/898,515

(22) Filed: Sep. 13, 2007

(65) Prior Publication Data
US 2009/0074013 A1 Mar. 19, 2009

(51) Int. Cl.
*H01S 3/30* (2006.01)
(52) U.S. Cl. .............................. 372/6; 385/126; 385/127
(58) Field of Classification Search ..................... 372/6; 385/126, 127
See application file for complete search history.

(56) References Cited

U.S. PATENT DOCUMENTS

| | | | |
|---|---|---|---|
| 5,291,501 A | | 3/1994 | Hanna |
| 5,495,494 A | | 2/1996 | Molva et al. |
| 5,530,709 A | | 6/1996 | Waarts et al. |
| 6,373,868 B1 | * | 4/2002 | Zhang ..................... 372/19 |
| 6,445,494 B1 | | 9/2002 | Nilsson et al. |
| 6,563,995 B2 | | 5/2003 | Keaton et al. |
| 6,614,975 B2 | | 9/2003 | Richardson et al. |
| RE38,298 E | | 11/2003 | Grasso et al. |
| 6,687,445 B2 | | 2/2004 | Carter et al. |
| 6,801,550 B1 | | 10/2004 | Snell et al. |
| 6,810,052 B2 | | 10/2004 | Chicklis et al. |
| 6,876,490 B2 | | 4/2005 | Kane et al. |
| 7,039,075 B2 | | 5/2006 | Thornton |
| 7,120,339 B2 | | 10/2006 | Varnham et al. |

(Continued)

FOREIGN PATENT DOCUMENTS

JP 2001-185790 7/2001

(Continued)

OTHER PUBLICATIONS

NuFERN, "Eye Safe 25/250 Thulium-Doped LMA Double Clad Fiber", Feb. 2007, NuFERN.*

(Continued)

*Primary Examiner*—Minsun Harvey
*Assistant Examiner*—Joshua King
(74) *Attorney, Agent, or Firm*—Posz Law Group, PLC

(57) ABSTRACT

An optical fiber amplifier includes a laser pump source for generating laser pump light; a fiber including an inner cladding layer optically coupled to a laser pump source for receiving laser pump light; a large mode area (LMA) core surrounded by the inner cladding, the LMA core including a confined region having a predetermined doping concentration of rare-earth ions for undergoing excitation to generate laser light when pumped by the laser pump light; and an outer cladding layer surrounding the inner cladding layer for substantially confining the laser pump light to the inner cladding and the LMA core. In a method of forming the optical fiber amplifier, a ratio of an area of the confined region to an area of the LMA core, and the predetermined doping concentration of the rare earth ions are selected so as to achieve a quantum efficiency (QE) gain factor of approximately 2, but such that the heat dissipation per unit length can be controlled by adjusting the area of the confined region.

17 Claims, 5 Drawing Sheets

U.S. PATENT DOCUMENTS

2002/0030881 A1  3/2002  Nilsson et al.
2004/0005127 A1  1/2004  Kliner et al.
2007/0047066 A1  3/2007  Green

FOREIGN PATENT DOCUMENTS

WO    WO 03/057643 A2    7/2003
WO    WO 03/057644 A2    7/2003

OTHER PUBLICATIONS

NuFERN, "Eye Thulium-Doped Large-Mode Area Fiber", Jan. 2006, NuFERN.*

Carl Crossland, "NuFERN introduces two new fibers into its family of "eye-safe" high power double clad products", Jan. 23, 2006, NuFERN, www.nufern.com/news_detail.php/46, 1.*

Oh et al., "Increased amplifier efficiency by matching the area of the doped fiber region with the fundamental fiber mode", 2005, Optical Society of America, Optical Fiber Communication Conference, 1-3.*

J. Geng, J. Wu, S. Jiang, and J. Yu, "Efficient operation of diode-pumped single-frequency thulium-doped fiber lasers near 2 μm," *Optics Letters*, vol. 32, No. 4, Feb. 15, 2007, pp. 355-357.

M. Hotoleanu, et al., "Coiling effects on high order mode suppression of a radially doped LMA fiber," Photonics West 2007, Lohja, Finland.

* cited by examiner

THULIUM DOPED FIBER CONFIGURATION FOR ENHANCED HIGH POWER OPERATION

TECHNICAL FIELD

The technical field relates generally to optical fiber lasers and methods of fabricating such optical fiber lasers and, more particularly, to optical fiber lasers having a confined Thulium doped configuration.

BACKGROUND

A conventional optical fiber laser featuring a dual clad fiber (DCF) amplifier can include a laser diode based pump source for emitting laser pump light, an optical fiber having a core doped with rare-earth ions, an inner cladding, and an outer cladding surrounded by an outer protective jacket. The pump source can be, for example, high brightness arrays of laser diode bars based on GaAlAs, GaInPAs, GaInAlAs, GaInAs or similar active layers. The rare-earth ions can be, for example, ytterbium (Yb), ytterbium/erbium (Yb/Er), or thulium (Tm), each lasing at different wavelengths in combination with appropriate diode pump wavelengths.

A conventional Tm-doped fiber laser pumped with standard diodes for emitting 790 nm light can emit a signal wavelength at 2000 nm. Thus, the conventional Tm-doped fiber laser has a maximum optical-to-optical efficiency of approximately 40% (790/2000). Under certain conditions, the optical-to-optical efficiency of a conventional Tm-doped fiber laser can theoretically be doubled by the so-called cross-relaxation process in which the $^3F_4$-$^3H_6$ pump transitions of $Tm^{3+}$ near 800 nm are utilized as shown in FIG. 4. The $Tm^{3+}$ cross-relaxation is a nonradiative process in which a single excited $Tm^{3+}$ ion in the $^3H_4$ level generates two $Tm^{3+}$ ions in the $^3F_4$ upper laser level, theoretically doubling the maximum optical-to-optical efficiency from 40% to 80%. The Quantum Efficiency (the number of photons emitted divided by the number of pump photons absorbed) is thus effectively doubled.

The mean inter-ionic distance must be sufficiently small such that the wave functions for the two ions can interact to achieve the cross-relaxation. Thus, the doping concentration of $Tm^{3+}$ must be sufficiently high. However, the high concentration of $Tm^{3+}$ leads to the drawback of increased density of heat generation, thereby resulting in high heat loads per unit length from intense pumping, and prohibiting high power applications through excessive temperature rise. The high heat loads can also cause fiber fusion (the fiber fuse phenomenon), in which the core of the fiber is destroyed by a moving melt zone driven by laser power absorption.

One approach to dealing with the high heat loads has been to provide robust fiber cooling means such as liquid nitrogen flowing around the fiber. However, such cooling means can not remove heat fast enough to prevent the initiation of fiber fusion at fiber power levels of interest.

Another approach to dealing with the high heat loads has been to reduce the size of the fiber core. However, this approach has the drawback of limited fiber power as a result of the intense beams inducing Brillouin scattering from acoustic vibrations, a phenomenon known as Stimulated Brillouin Scattering (SBS). Hence, restricting the core size to manage the heat load leads to limitations in the useful fiber power.

It would be desirable to have an optical fiber laser that can utilize the cross-relaxation process for operational use while having a sufficiently low heat load, i.e., power dissipated per unit fiber length. It would be further desirable for such an optical fiber laser to generate light with a wavelength within the eye safe spectral region for which the wavelength ($\lambda$) is greater than approximately 1.5 microns.

SUMMARY

The present disclosure concerns a fiber associated with a fiber amplifier, including: an inner cladding layer; an outer cladding layer surrounding the inner cladding layer; a large mode aperture (LMA) core disposed within the inner cladding layer; and a confined region within the LMA core. The confined region can include a predetermined doping concentration of thulium ion ($Tm^{+3}$). The ratio of the area of the confined region to the total area of the LMA core, and the predetermined doping concentration of $Tm^{+3}$, are selected so as to achieve a quantum efficiency (QE) gain factor of around 2.

The present disclosure also concerns a method of fabricating a fiber amplifier for generating laser light in response to pump light from a pump source. The method includes: forming a large mode area (LMA) core; and forming a confined region within a predetermined area of the LMA core, the confined region having a predetermined doping concentration of $Tm^{+3}$, wherein a ratio of the predetermined area of the confined region and an area of the LMA core, and the predetermined doping concentration of $Tm^{+3}$ are selected in order to achieve a predetermined QE gain defined as a ratio of emitted photons to absorbed pump photons.

Accordingly, a fiber amplifier or laser can operate at a high power while reducing the heat load to a tolerable level by using robust cooling means, and maintain the intensity of the laser signal at a level sufficiently low to avoid or prevent nonlinear effects such as Stimulated Brillouin Scattering.

BRIEF DESCRIPTION OF THE DRAWINGS

The accompanying figures, where like reference numerals refer to identical or functionally similar elements throughout the separate views and which together with the detailed description below are incorporated in and form part of the specification, serve further to illustrate various embodiments and to explain various principles and advantages all in accordance with the present invention.

DETAILED DESCRIPTION

In overview, the present disclosure concerns optical fiber lasers, and fiber amplifier associated with such fiber lasers. More particularly, various inventive concepts and principles are embodied in an apparatus, and methods therein for providing an improved optical fiber amplifier or laser.

The instant disclosure is provided to further explain in an enabling fashion the best modes of performing one or more embodiments of the present invention. The use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Referring to the figures, various embodiments of an optical fiber amplifier 100 will be discussed with reference to the drawings in which like numbers reference like components, and in which a single reference number may be used to identify an exemplary one of multiple like components. The optical fiber amplifier 100 receives an input signal at one end and emits an amplified version of that signal at the output end when appropriately pumped. Thus, the optical fiber amplifier can operate as a fiber laser when provided with means for feedback from the output end.

Figure 1A:
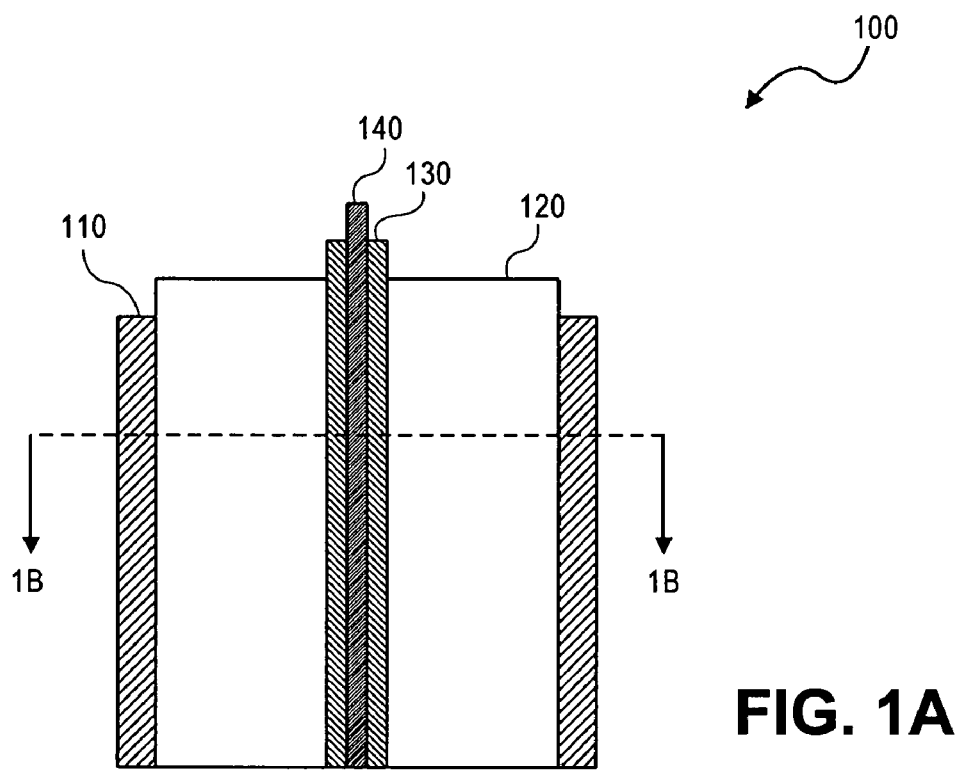
FIGS. 1A-1B are diagrams illustrating a Tm-doped optical fiber amplifier structure according to various embodiments.
Figure 1B:
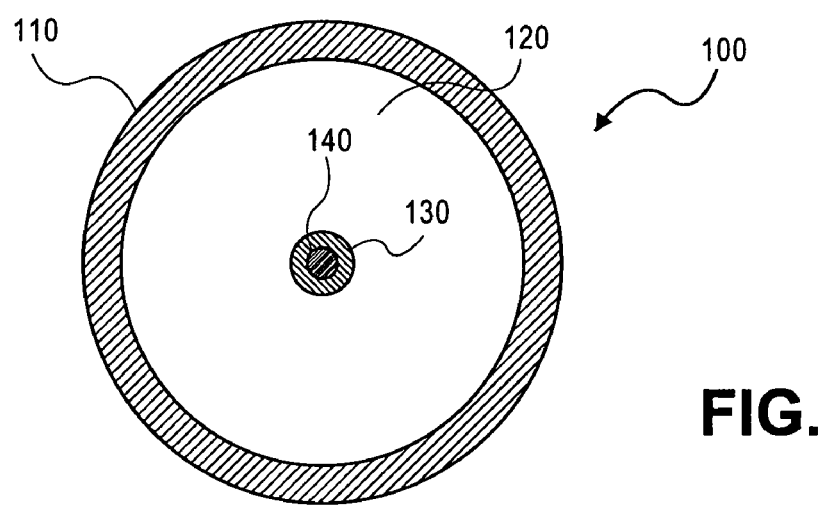

An elevational view of the optical fiber amplifier 100 is shown in FIG. 1A, and a cross-sectional view of the optical fiber laser 100 along line IB-IB of FIG. 1A is shown in FIG. 1B. The optical fiber amplifier 100 includes an outer cladding layer 110 surrounding an inner cladding layer 120, a large mode area (LMA) core 130 disposed within the inner cladding layer 120, and a confined doping region 140 within the LMA core 130.

The outer cladding layer 110 is for confining pump light, and the inner cladding layer 120 is for facilitating optical pumping. Accordingly, the outer cladding layer 110 is preferably composed of polymers or glass, and the inner cladding layer 120 is preferably composed of silica. Generally, the material of the outer cladding layer 110 should have a refractive index that promotes the wave guiding properties of the inner cladding layer 120.

The LMA core 130 is preferably composed of germanate or tellurite, though other materials such as silica can be used. A predetermined area of the LMA core 130, which is referred to here as the confined doping region 140, is doped with a predetermined doping concentration of rare-earth ions. Preferably, the rare-earth ions are thulium (Tm) $Tm^{3+}$ ions. However, the dopant in the confined region 140 is not limited to $Tm^{+3}$ ions. Other Lanthanide metals such as, for example, erbium (Er), praseodymium (Pr) or holmium (Ho) can be used in order to achieve a high doping concentration when that is desirable while reducing the linear density of heat generation.

The optical fiber amplifier 100 can be coupled to a pump source such as, for example, GaAlAs, GaAsP, or GaInAlAs diode pumps (not shown), to provide pump light which excites the rare-earth ions in the confined region 140 to thereby provide optical gain and amplification of laser light.

The optical fiber amplifier 100 can be mounted in thermal contact with a heat sink for removal of heat dissipated within the confined region 140 during high power operation. Alternatively, the fiber amplifier 100 can be suspended in a flowing liquid coolant.

Figure 4:
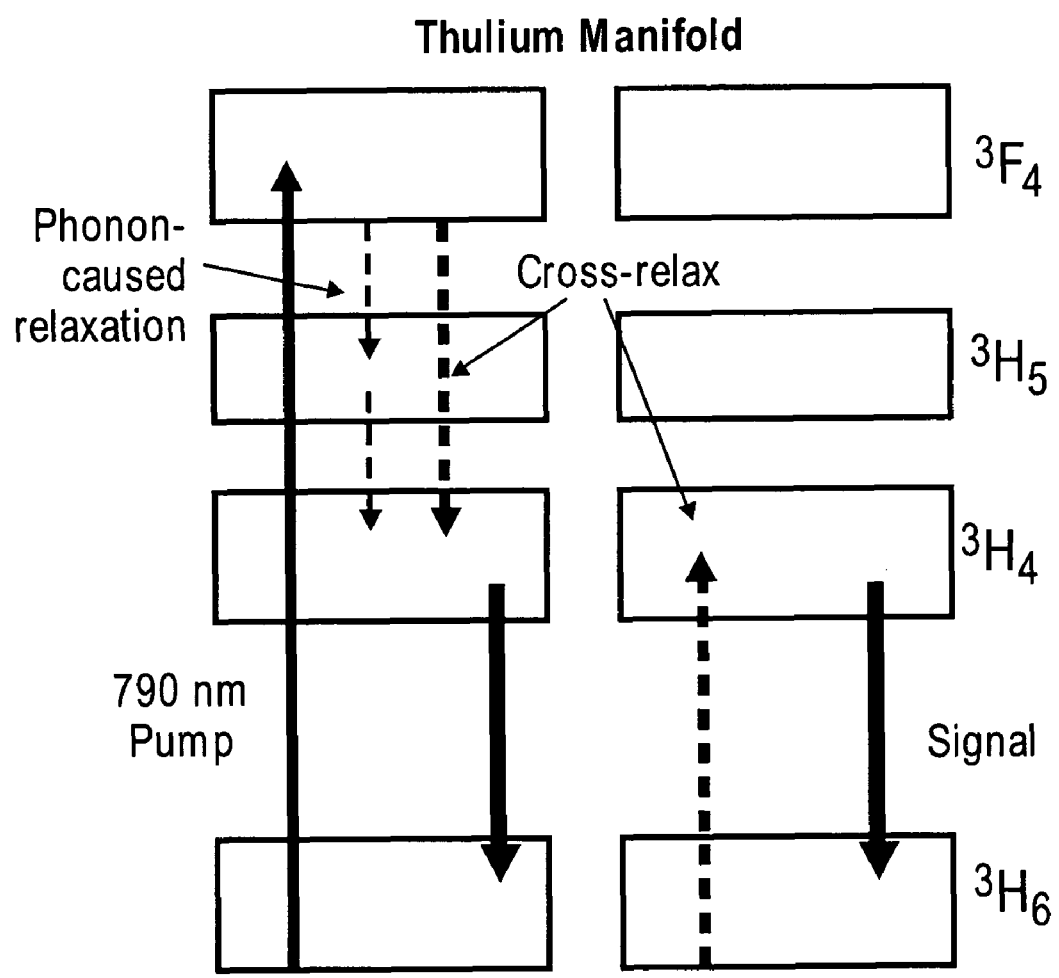
FIG. 4 is a representative illustration of the cross-relaxation process in thulium.

As discussed above, the Quantum Efficiency (QE) of the fiber amplifier 100 can be doubled (2×QE) by utilizing the $^3F_4$-$^3H_6$ pump transitions of $Tm^{3+}$ ions which occur during the cross-relaxation process. As shown in FIG. 4, during the cross-relaxation process a single excited $Tm^{3+}$ ion in the $^3H_4$ level generates two $Tm^{3+}$ ions in the $^3F_4$ upper laser level, theoretically doubling the QE from 1 to 2. As discussed below, a predetermined doping concentration $N_{crit}$ of the confined region 140 should be set to preferably assure 2×QE, or at least a QE greater than 1, as well as be confined to a smaller volume within the LMA core 130 so that heat loading can be reduced.

Given the areas of the confined region 140 including the rare earth ions ($A_{confinement}$), the area of the inner cladding layer 120 ($A_{clad}$), the doping concentration ($N_{crit}$) of Tm as the rare earth ions, the power of the laser pump light ($P_{pump}$) and the laser signal light ($P_{sig}$), the absorption cross section ($\delta_{abs}$) and emission cross section ($\delta_{emiss}$), the absorption of pump light and the gain in laser signal along the length z of the fiber amplifier is shown below by Formulas (1):

$$\frac{dP_{pump}}{dz} = \sigma_{abs} N_{crit}^{Tm} \frac{A_{confinement}}{A_{clad}} P_{pump}$$

$$\frac{dP_{sig}}{dz} = \sigma_{emiss} N_{crit}^{Tm} \frac{A_{confinement}}{A_{clad}} P_{sig}$$

Formulas (1) imply that the ratio of fiber length needed for fixed absorbed power and signal gain is inversely proportional to the ratio of the area of the confined region 140 to the area of the inner cladding layer 120. That is, reducing the area of the confined region 140 by half requires increasing the fiber length by twice. Further, the heat load is also proportional to the ratio of the area of the confined region 140 to the area of the inner cladding layer 120. Thus, the length of the optical fiber can be increased to reduce the heat load while maintaining constant signal gain and pump absorption.

Figure 3A:
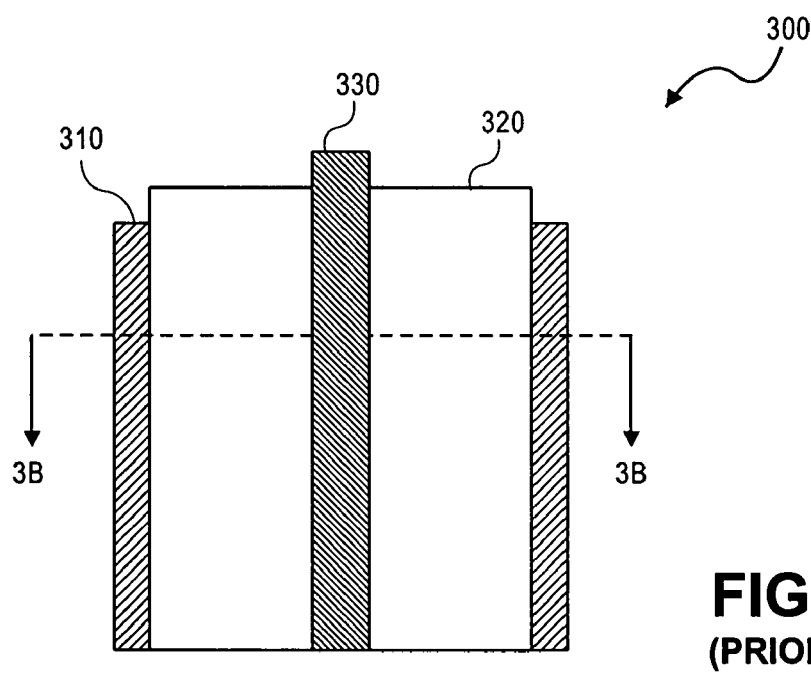
FIGS. 3A-3B are diagrams illustrating a conventional Tm-doped optical fiber amplifier.
Figure 3B:
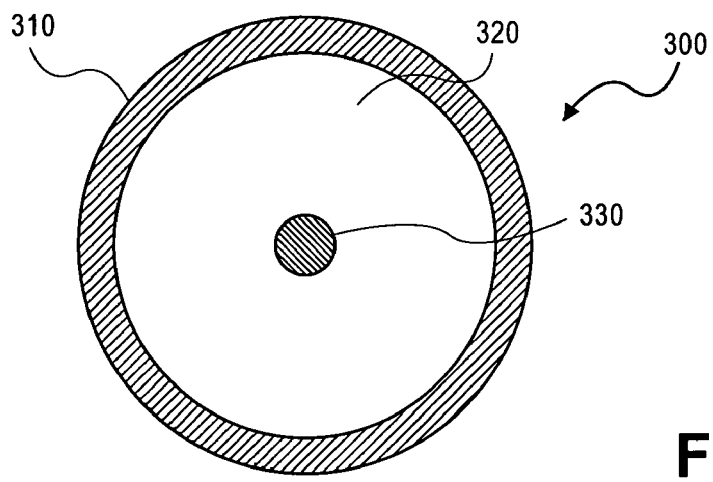

As shown in FIGS. 3A-3B, a conventional optical fiber laser 300 includes an outer cladding layer 310 surrounding an inner cladding layer 320, and a Tm-doped LMA core 330 disposed within the inner cladding layer 320. Accordingly, the ratio of the area of the Tm-doped LMA core 330 to the total inner cladding layer 320 area is established in accordance with the relationships discussed below in order to reduce heat and achieve fixed absorbed power and signal gain.

$$\frac{dP_{pump}}{dz} = \sigma_{abs} N_{crit}^{Tm} \frac{A_{confinement}}{A_{clad}} P_{pump} \qquad \text{Formulas (2)}$$

$$\frac{dP_{sig}}{dz} = \sigma_{emiss} N_{crit}^{Tm} \frac{A_{confinement}}{A_{clad}} P_{sig}$$

The ratio of fiber length needed for fixed absorbed power and signal gain in the conventional fiber laser 300 is inversely proportional to the ratio of the area of the LMA core 330 to the area of the inner cladding 320 rather than just the confined region as in the fiber amplifier 100. In comparison, the fiber amplifier 100 of FIGS. 1A-1B can distribute the power dissipated in the amplification process along a fiber of greater length, thereby reducing temperature rise in the fiber core.

Further, the area of the LMA core 130 may be sufficiently large so as to suppress or minimize undesirable nonlinear parasitic effects such as Stimulated Brillouin Scattering (SBS), Four Wave Mixing (FWM), Self-Phase Modulation (SPM), Cross Phase Modulation (XPM) and Stimulated Raman Scattering (SRS) when operated at higher optical power levels.

Figure 2:
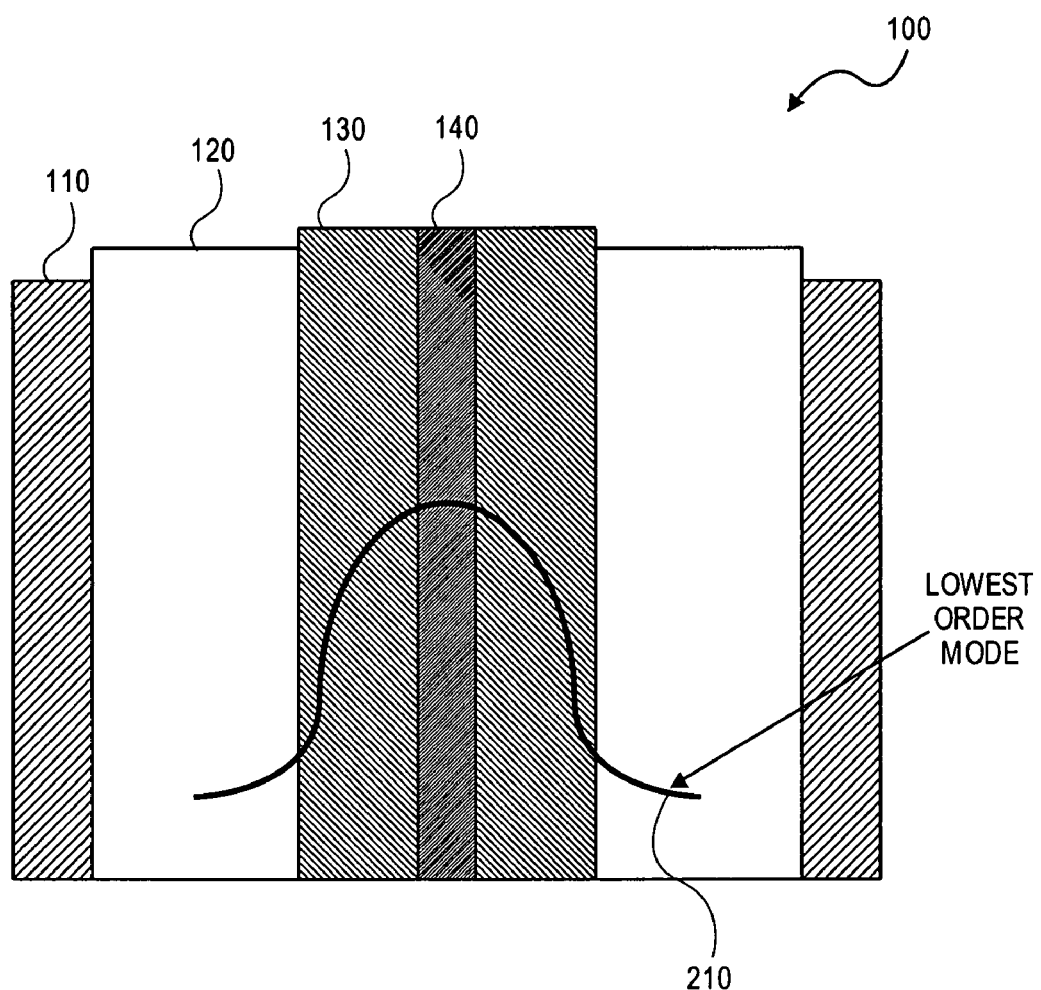
FIG. 2 is a diagram illustrating the lowest order mode of the optical fiber amplifier shown in FIGS. 1A-1B.

The lowest order mode of the fiber amplifier 100 is shown in FIG. 2. The mode has a Gaussian-like profile with the mode primarily confined in the LMA core 130 and the peak in the confined doping region 140. Accordingly, the confined region has increased coupling with excited ions, and the LMA core 130 can achieve efficient gain saturation due to the overlap with the confined region 140. Further, selectivity of the lowest order mode can be achieved by adjusting the area of the confined region 140 and the inner cladding 120. Because of this selectivity, a larger LMA core size in possible, further reducing nonlinear effects for a given confined doping region.

The predetermined doping concentration of the rare earth ions in the confined region 140 of the LMA core 130 should be sufficient for providing optical gain only within the confined region 140. Thus, the propagating signal mode supported by the LMA core substantially overlaps the confined region containing the $Tm^{+3}$ ion doping, such that the optical gain for the lowest order propagating signal mode is greater than that for any other higher order propagating signal mode, and hence operation in the lowest order signal mode is favored and maximally efficient. The $Tm^{+3}$ of the confined region can provide laser light well within the eyesafe region. Further, although the 2×QE effect has only been discussed here primarily for $Tm^{+3}$ ions, it should be noted that any other RE ions in particular fiber glass compositions that can achieve the 2×QE effect by fortuitous alignment of energy levels can also be used.

Figure 5:
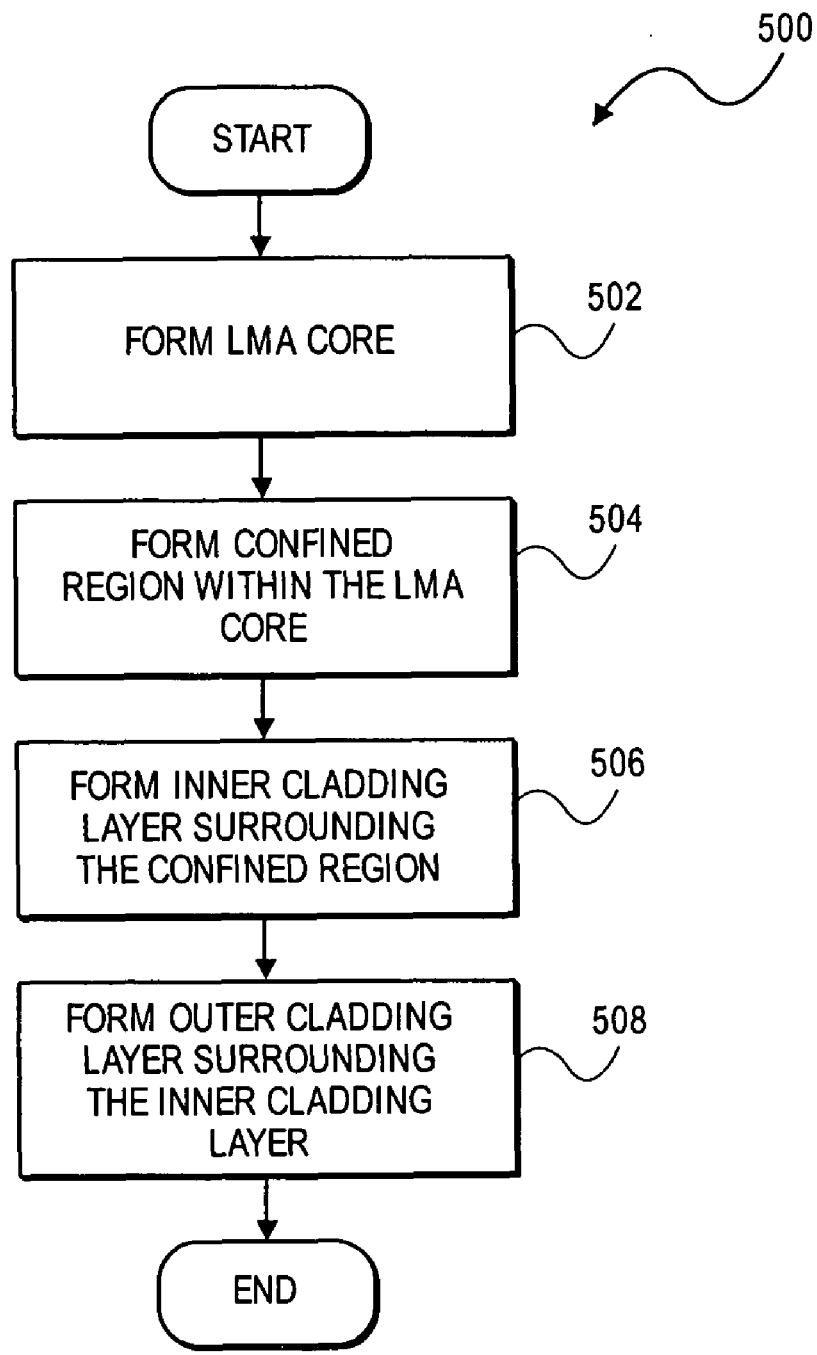
FIG. 5 is a diagram illustrating an embodiment of a method for manufacturing an optical fiber amplifier similar to the optical fiber amplifier structure shown in FIGS. 1A-1B.

Referring to FIG. 5, a method of fabricating a fiber amplifier for an optical fiber laser will be discussed. At 502, a fiber with the LMA core 130 is formed with sufficient size for accommodating the confined region 140 to suppress nonlinear parasitic effects during high power operation. The fiber of the LMA core 130 can be coiled to strip out higher order modes and thereby support a large area single propagating signal mode.

At 504, a predetermined area of the LMA core 130 is doped during the fabrication process with a predetermined doping concentration of a rare earth ion, primarily $Tm^{+3}$, to form the confined region 140. The predetermined area of the confined region 140, the area of the LMA core 130, and the predetermined doping concentration of rare earth ion are selected in order to achieve the 2×QE effect. The predetermined area of the confined can be adjusted to control a level of heat dissipation per unit length of fiber. Also, the predetermined doping concentration of the rare earth ion sufficient for providing optical gain should exist only within the confined region 140.

In order to maintain a substantially equal refractive index between the LMA core 130 and the confined region 140, additional constituents such as fluorine, Al, P, or other elements having known refractive index impact, can be added to the LMA core 130 to compensate for a refractive index change in the confined region due 140 resulting from the doping action. Maintaining a substantially equal refractive index between the LMA core 130 and the confined region 140 ensures that a propagating signal mode supported by the LMA core 130 substantially overlaps the confined region 140 to thereby make an optical gain for the lowest order propagating signal mode greater than that for any other higher order propagating signal mode and ensures efficient extraction of the stored energy.

At 506, the inner cladding layer 120 is formed to surround the LMA core 130. At 508, the outer cladding layer 110 is formed to surround the inner cladding layer 120. As discussed above, the inner cladding layer 120 can be formed from silica, perhaps with dopants for refractive index modification, and the outer cladding layer can be formed from polymers or low index glass. It is understood that the details of fabricating the layers are well understood by those versed in the art, and that the sequence of steps described above are conceptual for the purpose of understanding the operation of the disclosed device.

The optical fiber, including the cladding layers and the core, can be made by first constructing a large-diameter preform and then pulling the preform to form the long thin optical fiber.

The outer cladding layer 110 can be mounted to be in thermal contact with a heat sink (not shown) for removal of heat dissipated within the confined region 140 during high power operation, such that the temperature does not rise excessively so as to reduce the QE. Alternatively, the outer cladding layer 110 can be suspended in a liquid coolant for heat removal.

The optical fiber amplifier 100 can also be incorporated into a conventional high power fiber laser as well as the Tm-doped fiber amplifier discussed above, with the same advantages. Examples of such laser configurations include power oscillators, master oscillator power amplifiers (MOPAs), coherently combined phased arrays and spectrally combined arrays.

The apparatuses and methods discussed above and the inventive principles thereof are intended to and will provide an optical fiber amplifier having capability of high power operations. It is expected that one of ordinary skill given the above described principles, concepts and examples will be able to implement other alternative procedures and constructions that offer the same benefits. It is anticipated that the claims below cover many such other examples.

What is claimed is:

1. A method of fabricating a fiber amplifier generating laser light in response to pump light from a pump source, the method comprising:
   forming a large mode area (LMA) core; and
   forming a confined region having a predetermined area within the LMA core and a predetermined doping concentration of thulium ion ($Tm^{+3}$),
   wherein a ratio of the predetermined area of the confined region and an area of the LMA core, and the predetermined doping concentration of Tm are selected in order to achieve a predetermined Quantum Efficiency (QE) gain greater than a factor of 1, the QE gain defined as a ratio of emitted photons to absorbed pump photons, and
   wherein the forming of the confined region further includes forming the confined region so that a propagating signal mode supported by the LMA core substantially overlaps the confined region containing the predetermined doping concentration of $Tm^{+3}$ to thereby make an optical gain for the lowest order propagating signal mode greater than that for any other higher order propagating signal mode,
   wherein the forming of the LMA core further includes adding additional constituents other than $Tm^{+3}$ to the LMA core to compensate for a refractive index change in the confined region due to the predetermined doping concentration of Tm so that the LMA core and the confined region have a substantially equal refractive index.

2. The method according to claim 1, further comprising:
   forming an inner cladding layer surrounding the LMA core; and
   forming an outer cladding layer surrounding the inner cladding layer.

3. The method according to claim 1, wherein the predetermined QE gain is equal to a factor between 1 and 2.

4. The method according to claim 1, further comprising:
   forming an inner cladding layer surrounding the LMA core;
   forming an outer cladding layer surrounding the inner cladding layer; and
   mounting the outer cladding layer to be in thermal contact with a heat sink for removal of heat dissipated within the confined region during high power operation, such that the temperature does not rise excessively so as to reduce the QE.

5. The method according to claim 1, further comprising:
forming an inner cladding layer surrounding the LMA core;
forming an outer cladding layer surrounding the inner cladding layer; and
suspending the outer cladding layer in a liquid coolant for removal of heat dissipated within the confined region during high power operation, such that the temperature does not rise excessively so as to reduce the QE.

6. The method according to claim 1, wherein the forming of the LMA core further includes forming the LMA core to have a large predetermined area to thereby suppress nonlinear parasitic effects including one of a group consisting of Stimulated Brillouin Scattering (SBS), Four Wave Mixing (FWM), Self-Phase Modulation (SPM), Cross Phase Modulation (XPM) and Stimulated Raman Scattering (SRS) during high power operation.

7. A fiber associated with a fiber laser, the fiber comprising:
an inner cladding layer;
an outer cladding layer surrounding the inner cladding layer;
a large mode aperture (LMA) core disposed within the inner cladding layer; and
a confined region confined by the LMA core, the confined region having a predetermined doping concentration of thulium ion ($Tm^{+3}$),
wherein a ratio of an area of the confined region and an area of the LMA core, and the predetermined doping concentration of Tm are selected so as to achieve a quantum efficiency (QE) gain factor between 1 and 2,
wherein a propagating signal mode supported by the LMA core substantially overlaps the confined region containing the predetermined doping concentration of $Tm^{+3}$ to thereby make an optical gain for the lowest order propagating signal mode greater than that for any other higher order propagating signal mode,
wherein the LMA core and the confined region have a substantially equal refractive index, and
wherein the LMA core includes additional constituents other than $Tm^{+3}$ as compared to the confined region.

8. The fiber according to claim 7, wherein the fiber is mounted to a heat sink or suspended in a liquid coolant for removal of heat dissipated within the confined region during high power operation.

9. The fiber according to claim 7, wherein the area of the LMA core has a predetermined value to suppress or minimize nonlinear parasitic effects including one of a group consisting of Stimulated Brillouin Scattering (SBS), Four Wave Mixing (FWM), Self-Phase Modulation (SPM), Cross Phase Modulation (XPM) and Stimulated Raman Scattering (SRS) when operated at high optical power levels.

10. The fiber according to claim 7, wherein the confined region of the LMA is configured such that pump light introduced into the inner cladding layer is absorbed by the Tm in the confined region of the LMA core.

11. An optical fiber amplifier comprising:
a laser pump source for generating laser pump light;
a fiber including an inner cladding layer optically coupled to a laser pump source for receiving laser pump light;
a large mode area (LMA) core surrounded by the inner cladding layer, the LMA core including a confined region having a predetermined doping concentration of rare-earth ions for undergoing excitation to generate laser light when pumped by the laser pump light; and
an outer cladding layer surrounding the inner cladding layer for substantially confining the laser pump light to the inner cladding and the LMA core,
wherein a ratio of an area of the confined region and an area of the LMA core, and the predetermined doping concentration of the rare earth ions are selected so as to achieve a quantum efficiency (QE) gain factor between 1 and 2,
wherein a propagating signal mode supported by the LMA core substantially overlaps the confined region containing the predetermined doping concentration of $Tm^{+3}$ to thereby make an optical gain for the lowest order propagating signal mode greater than that for any other higher order propagating signal mode,
wherein the LMA core and the confined region have a substantially equal refractive index, and
wherein the LMA core includes additional constituents other than $Tm^{+3}$ as compared to the confined region.

12. The optical fiber amplifier of claim 11, wherein the rare earth ions comprise thulium ions ($Tm^{+3}$).

13. The optical fiber amplifier of claim 11, wherein the laser pump source comprises arrays of semiconductor laser diodes.

14. The optical fiber amplifier of claim 11, wherein a refractive index of the LMA core and the confined region is substantially constant.

15. The optical fiber amplifier of claim 11, further comprising a heat sink mounted to the outer cladding layer to dissipate heat from the confined region during high power operation.

16. The method according to claim 1, further comprising adjusting the predetermined area of the confined to control a level of heat dissipation per unit length of fiber.

17. The method according to claim 1, wherein the forming of the LMA core further includes adding at least one of fluorine, aluminum, or phosphorus to the LMA core.

* * * * *